Figure 1:
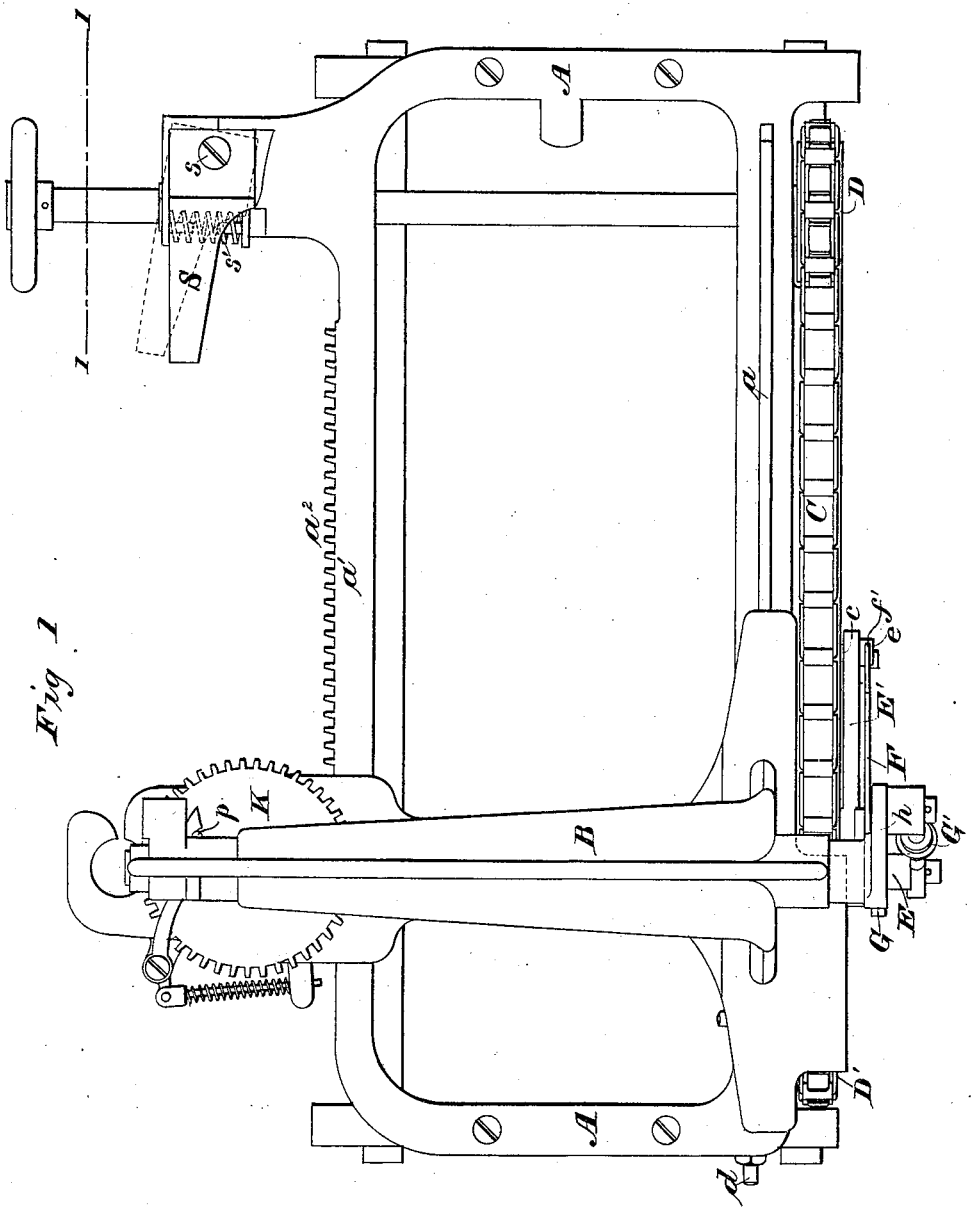

4 Sheets—Sheet 1.

W. R. BAKER & C. B. WITHINGTON.
Grain-Binder.

No. 201,149. Patented March 12, 1878.

WITNESSES
Wm. A. Skinkle
Geo. W. Breck

INVENTORS
William R. Baker
Charles B Withington
By their Attorneys
Baldwin, Hopkins & Peyton 4 Sheets—Sheet 2.

W. R. BAKER & C. B. WITHINGTON.
Grain-Binder.

No. 201,149. Patented March 12, 1878.

WITNESSES
Wm. A. Skinkle.
G. W. Breck.

INVENTORS
William R. Baker.
Charles B Withington

By their Attorneys.
Baldwin, Hopkins & Peyton

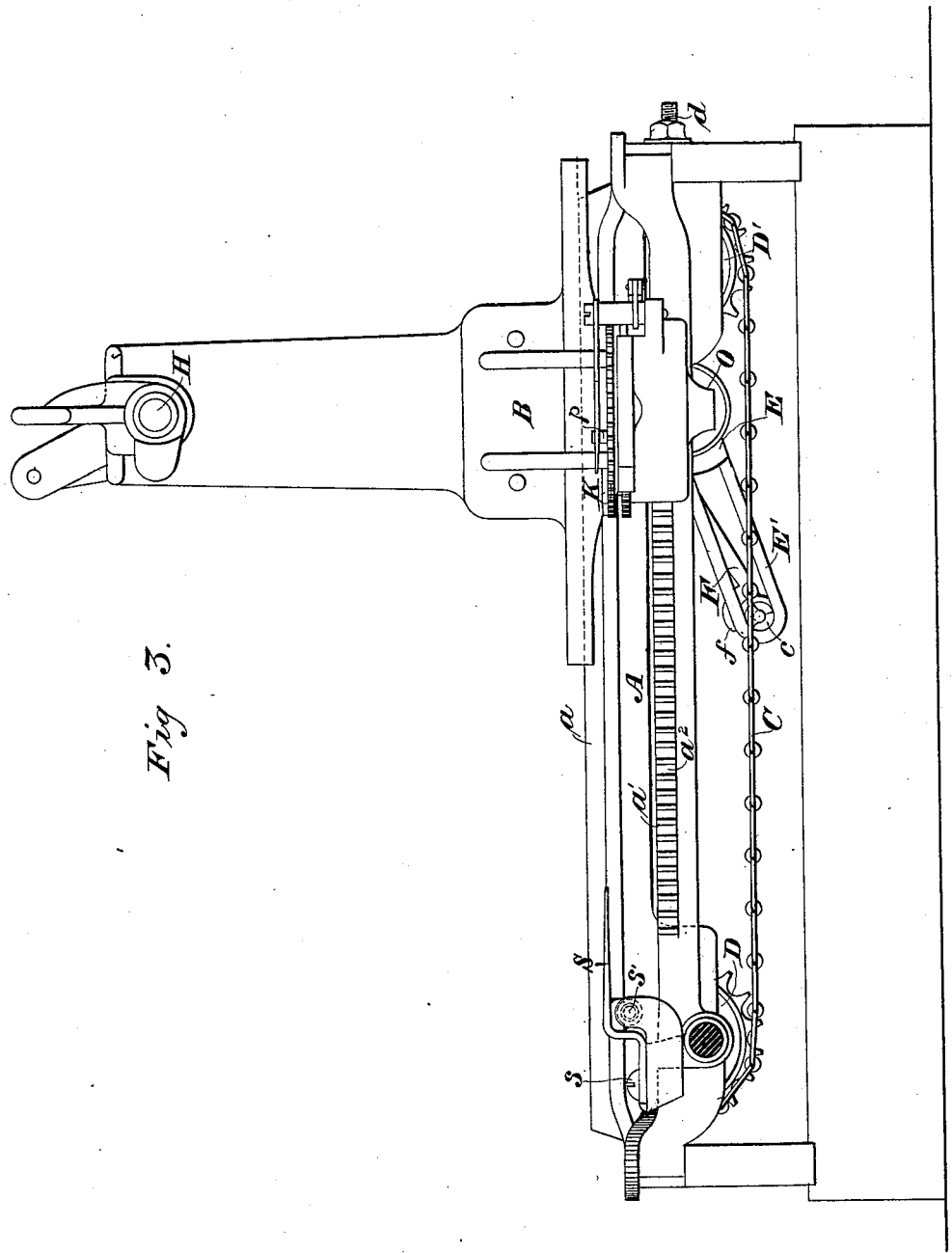

4 Sheets—Sheet 4.
W. R. BAKER & C. B. WITHINGTON.
Grain-Binder.
No. 201,149. Patented March 12, 1878.
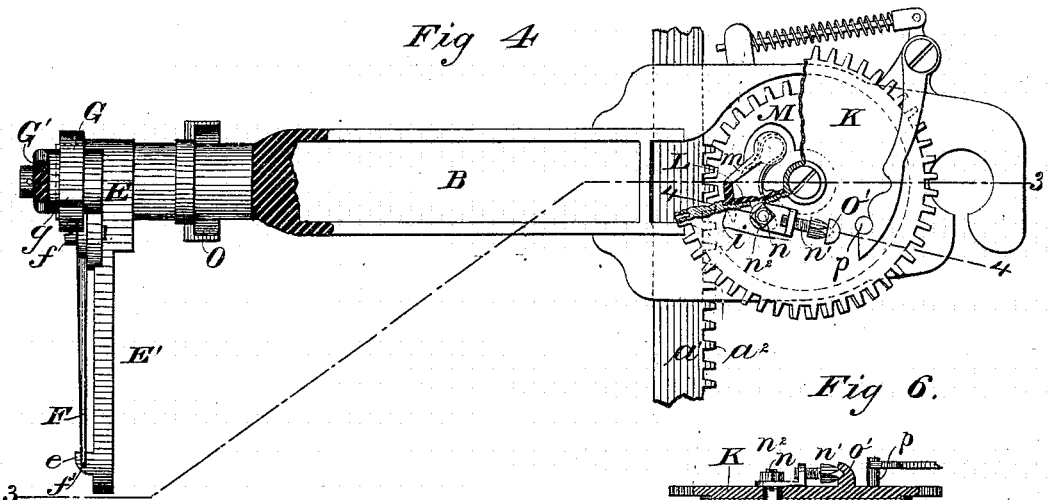
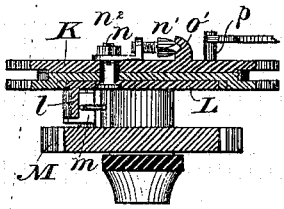
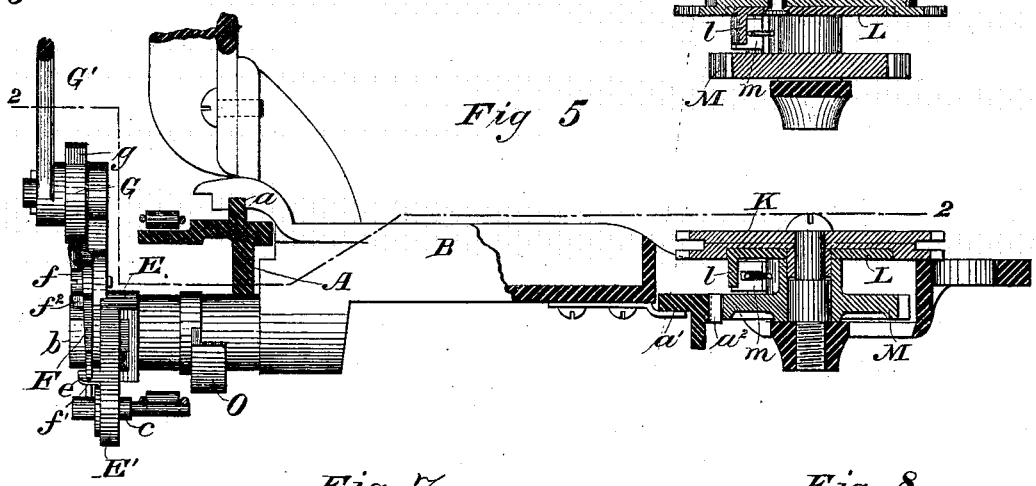
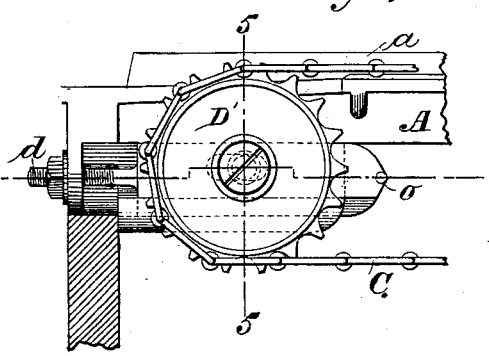
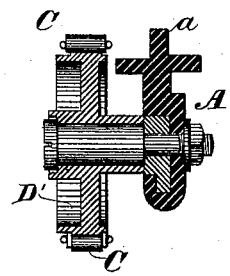
WITNESSES
Wm. A. Skinkle
Geo W Breck
INVENTORS
William R Baker
Charles B Withington
By their Attorneys
Baldwin, Hopkins & Peyton

UNITED STATES PATENT OFFICE.

WILLIAM R. BAKER, OF CHICAGO, ILLINOIS, AND CHARLES B. WITHINGTON, OF JANESVILLE, WISCONSIN, ASSIGNORS TO C. H. AND L. J. McCORMICK, OF CHICAGO, ILLINOIS.

IMPROVEMENT IN GRAIN-BINDERS.

Specification forming part of Letters Patent No. 201,149, dated March 12, 1878; application filed December 21, 1877.

*To all whom it may concern:*

Be it known that we, WILLIAM R. BAKER, of Chicago, in the county of Cook and State of Illinois, and CHARLES B. WITHINGTON, of Janesville, in the county of Rock and State of Wisconsin, have invented certain new and useful Improvements in Grain-Binders, of which the following is a specification:

Our invention relates to and constitutes an improvement upon the well-known "McCormick binder," more especially as exemplified in Letters Patent No. 191,096, granted May 22, 1877, to Wm. R. Baker, and in the application for Letters Patent by Lambert Erpelding, of Chicago, aforesaid, assignor to C. H. and L. J. McCormick, filed January 27, 1877.

The object of the first part of our invention is to automatically lock and unlock the reciprocating binding-carriage at each end of its stroke, and simultaneously to hold and release the binder-arm in order to lock it in its uplifted position when moving forward to grasp a bundle, and to release it at the proper time to enable it to effect that operation, which ends we obtain by combining with an intermittingly-rotating crank, actuated by a driving-chain, a locking-stop, which simultaneously locks the binding-carriage and engages with a stop on the crank which actuates the binder-arm.

The object of the next part of our invention is to prevent derangement of the twisting mechanism by the stretching or wearing of the driving-chain, which irregularities we compensate by mounting the lug upon which the pawl of the gear-wheel which drives the differential gear, twister, and cutter acts upon a movable plate, pivoted concentrically upon the differential wheel, and providing it with adjusting mechanism, so that the teeth of the differential wheel can be adjusted to compensate variations in the length of the driving-chain.

The next part of our invention relates to that part of the mechanism which gives the half-revolution to the twister on the forward movement of the binding-head. Its object is to prevent breakage or derangement of the mechanism should the operator, in oiling the twister-gearing, carelessly leave the pin which locks the differential gear in a line between the stud or push-bar which actuates said pin and the hub of the differential gear-wheel, which liability we obviate by pivoting the stud or push-bar so as to allow it slight lateral play, and provide it with a spring which normally retains it in its proper position, but yields when it encounters a rigid obstacle.

Figure 2:
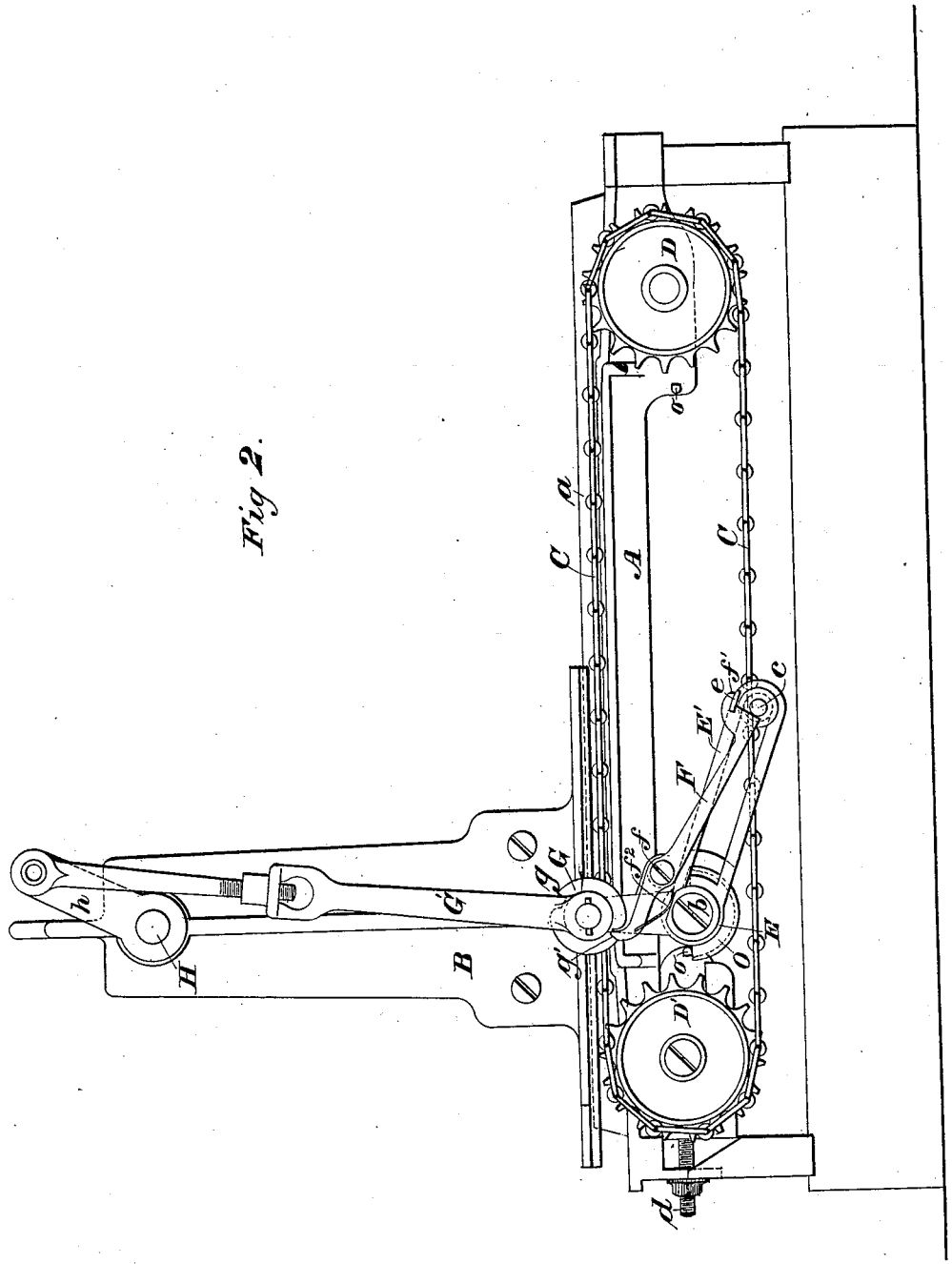

In the accompanying drawings, which represent so much of a McCormick binder with our improvements applied thereto as is necessary to illustrate the subject-matter herein claimed, Figure 1 represents a plan or top view; Fig. 2, a rear elevation thereof, showing the parts in the position they occupy at the moment the binder-arm begins to move forward in its uplifted position. Fig. 3 represents a similar view of the opposite side of the same, partly in section, on the line 1 1 of Fig. 1. Fig. 4 represents a plan or top view of the differential gear, the crank, the locking-stop, and traversing-carriage, on the line 2 2 of Fig. 5, with parts broken away to show the internal construction more clearly. Fig. 5 represents a view, in elevation, of the parts shown in Fig. 4, partly in section, on the line 3 3 of said figure. Fig. 6 represents a vertical diagonal section through the differential gear on the line 4 4 of Fig. 4. Fig. 7 represents a view, in elevation, of the devices for tightening the driving-chain; and Fig. 8, a vertical transverse section therethrough on the line 5 5 of Fig. 7.

It is deemed unnecessary to describe in detail the construction of the binder, as it is fully exemplified in patents heretofore granted to ourselves and Erpelding jointly and severally.

A represents the binder-frame, provided with ways $a$ $a^1$, upon which the binding-carriage B reciprocates, with a rack, $a^2$, for actuating the twisting mechanism. The binding-carriage is reciprocated by means of a driving-chain, C, running over sprocket-wheels D D', and driven in usual well-known ways. The chain is tightened to compensate wear by means of an adjusting-screw, *d*, Fig. 7, which controls the movable bearing in which one of the sprocket-wheels is mounted.

A pin, *c*, on the driving-chain works in a slot in one arm, E′, of an elbow-crank, E, mounted on a stud-axle, *b*, of the traversing-carriage.

In order to prevent the traversing-carriage from running faster than the chain, or, in other words, to prevent the slotted crank from over-running its driving-pin, which is apt to be the case when the traversing-carriage is inclined, we mount a locking-latch, F, upon a pivot, *f*, intermediate of its length, upon the slotted arm E′ of the intermittingly-rotating crank E. The outer end of this latch moves vertically in a guide-flange, *e*, on the slotted arm, and is provided with a stop, $f^1$, to limit its descent. When in its lowest position its end abuts against the driving-pin and holds it at the extremity of the slotted arm, thus locking the driving-pin and carriage together. A spring, $f^2$, bearing on the opposite end of the latch, tends to hold the parts in their locked position. This latter end of the latch is also provided with a toe, which alternately enters notches *g g′*, in a disk, G, connected with a pitman, G′, which actuates the rock-shaft H, which carries the binder-arm and compresser through the medium of a crank, *h*, as is well understood.

The binder-arm is locked in its elevated position and automatically released at the proper time simultaneously with the release of the driving-pin by the rotation of the elbow-crank E E′, which takes place as the driving-pin passes around its sprocket-wheel.

The carriage is held stationary at each end of its stroke while the binder-arm is closing around the bundle, and in opening, by pins *o* and a half-shell, O, on the elbow-crank, as described in Baker's patent, above mentioned.

The differential gear-wheel K, which drives the cutters and twisting mechanism, is, in its general construction, similar to that shown and described in the application of Erpelding, above mentioned. It is, however, for convenience of construction, made in two sections or disks, bolted together. Experience has demonstrated that, as the relation of the teeth of the twister-pinion to the mouth of the cutter-head is dependent upon the relation of the stationary rack to the differential gear, and as this relation in turn is dependent upon the length of the driving-chain, the wearing or stretching of the driving-chain sometimes throws the teeth of the sectional twister or cutter into improper relation.

We obviate this objection by mounting the lug *l*, upon which the pawl *m* of the driving-gear M acts to move the differential gearing, and consequently the twister-pinions, upon a plate, L, mounted concentrically upon the axis of the differential wheel, and capable of a slight turning movement thereon. A stud, *n*, on this plate extends up through a slot in the differential gear, and is provided with a set-screw, $n^1$, abutting against a lug, *o′*, on the gear, to adjust the relation of the lug *l* with its driving-pawl.

A clamp-nut, $n^2$, on the stud *n* serves to lock the parts securely in position when adjusted.

By this mode of construction we are enabled, when the chain becomes worn, to shorten it by taking out a link, and still to preserve the proper relation of the teeth of the cutter-pinion.

The organization of this machine is such that, as the twisting mechanism moves forward to carry the wire around the bundle, a half-turn is given to the twister-pinion to carry the first wire that enters the jaws of the twister around to its back, so as to be opposite the second wire which enters. This operation is caused by a stud-pin, *p*, on the differential gear K abutting against the stud or push-bar S on a fixed portion of the frame.

In the Erpelding application above mentioned, this stud is rigid. Consequently, if the operator should carelessly leave the stud-pin *p* out of gear with the latch, or in a line between the hub of the differential gear and the stud *s*, it might break the machine. To obviate this difficulty we pivot the push-bar S upon a pivot, *s*, so as to allow it a slight lateral or horizontal play, and maintain it in its normal position by a spiral spring, *s′*. (See Figs. 1 and 3.) Under this construction, when the stud *p* strikes the push-bar S squarely, and is in proper position, the differential wheel K is rotated; but when the pin is out of position it strikes upon the sloping side of the push-bar, which yields laterally, and thus prevents injury to the differential gear.

The operation of our improvements will readily be understood from the foregoing description.

What we claim as our own invention, and desire to secure by Letters Patent, is—

1. The combination, substantially as hereinbefore set forth, of the reciprocating binding-carriage, the slotted intermittingly-rotating crank mounted thereon, the traversing driving-chain carrying a pin working in a slot of the crank-arm, the locking-latch pivoted upon the crank-arm, and simultaneously acting upon the pin of the driving-chain, and the pitman which actuates the binding-arm, whereby the binding-carriage and binding-arm are automatically locked in position and released at the proper moment by a single instrumentality.

2. The combination, substantially as hereinbefore set forth, of the lug on the turning-plate, and mechanism for securing said plate when adjusted, mounted upon the differential gear, whereby the proper relation of the parts of the twister is preserved, notwithstanding variations in the length of the driving-chain.

3. The combination, substantially as hereinbefore set forth, of the reciprocating intermittingly-rotating differential gear actuating the twister, and the laterally-yielding push-bar, whereby breakage of the twister-gearing is prevented.

In testimony whereof we have hereunto subscribed our names.

WM. R. BAKER.
CHAS. B. WITHINGTON.

Witnesses:
JOHN V. A. HASBROOK,
WM. J. PEYTON.